United States Patent Office 2,717,581
Patented Sept. 13, 1955

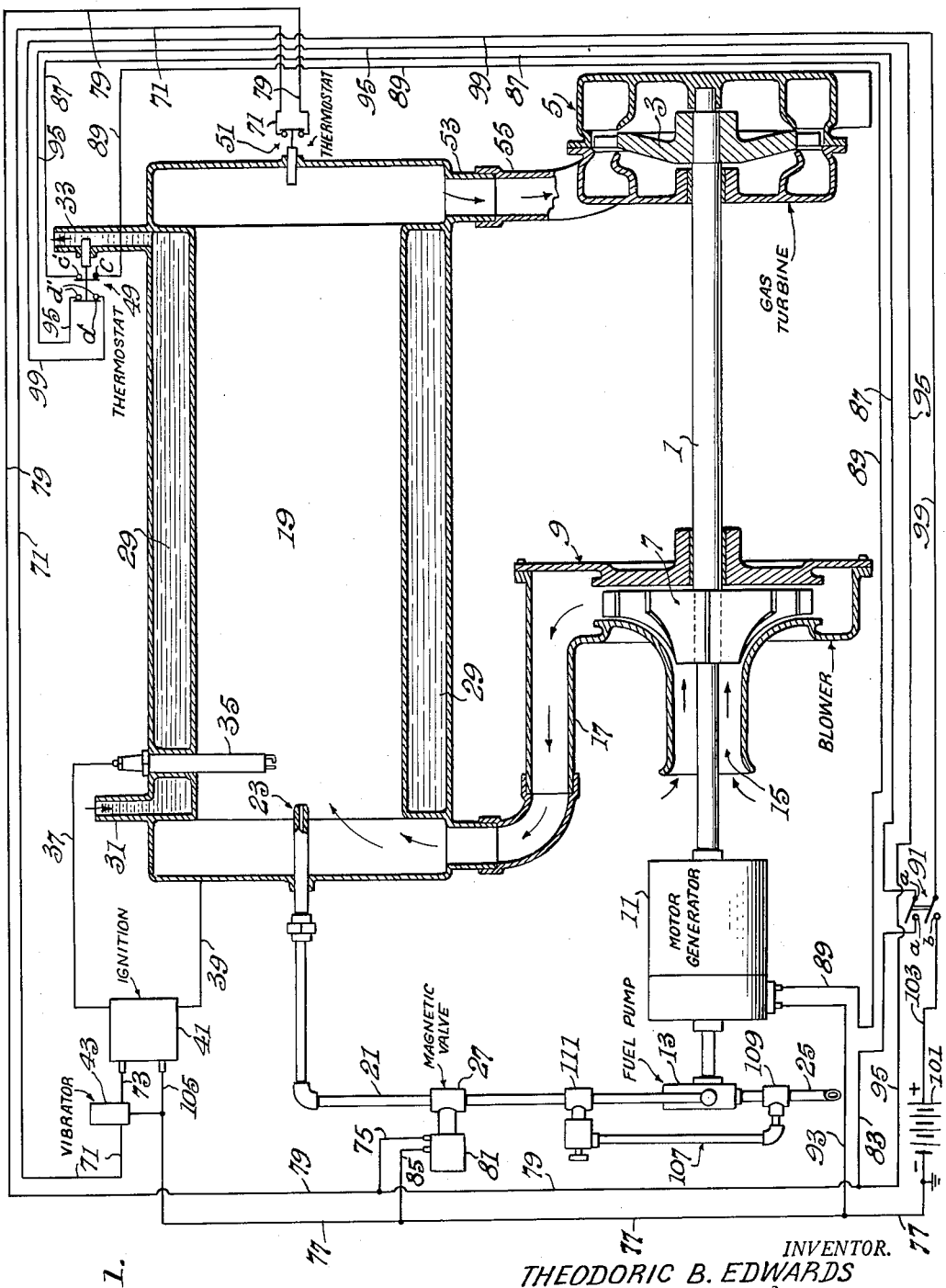

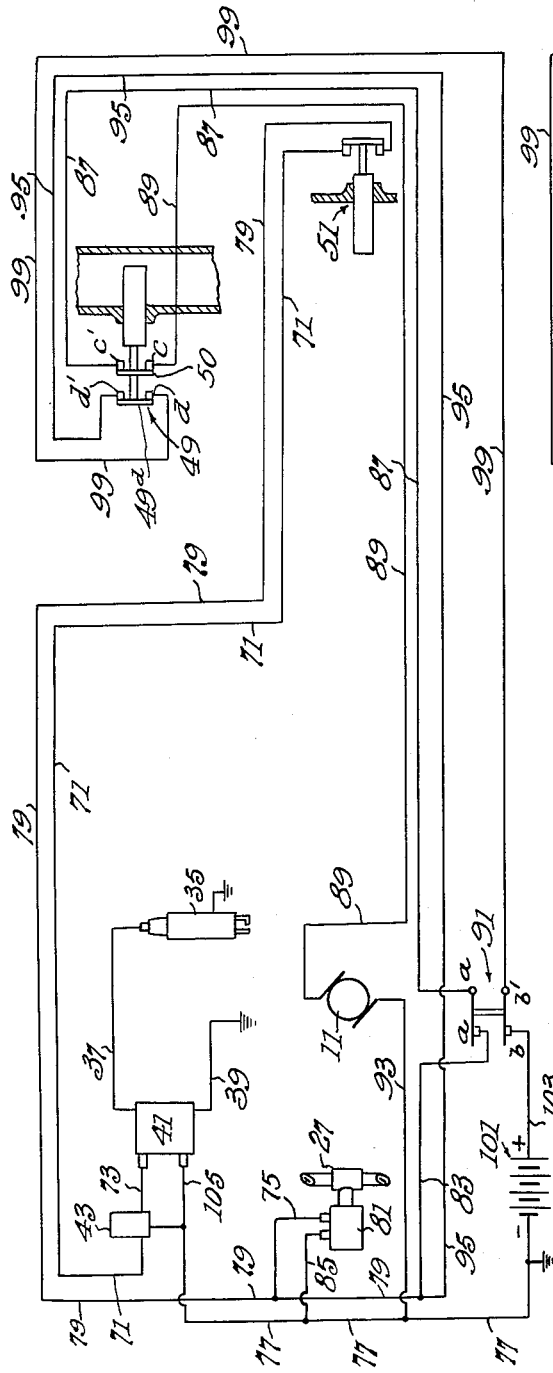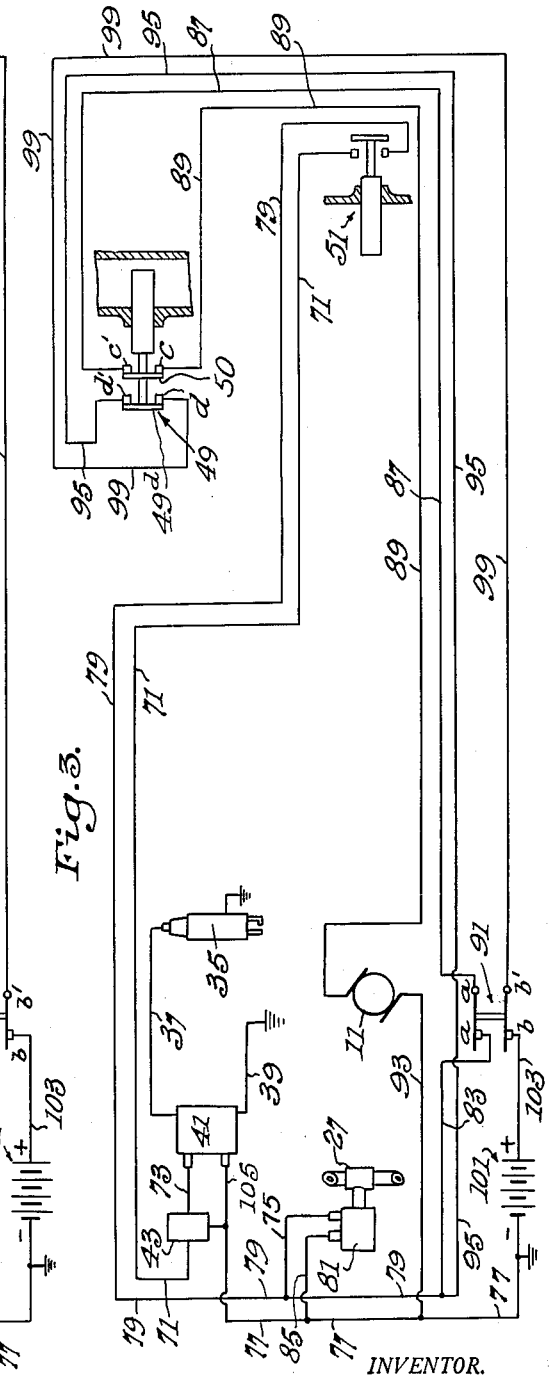

2,717,581

AUTOMATICALLY CONTROLLED WATER HEATER

Theodoric B. Edwards, Hybla Valley, Va.

Application June 6, 1951, Serial No. 230,201

4 Claims. (Cl. 122—448)

(Granted under Title 35, U. S. Code (1952), sec. 266)

The invention described herein may be manufactured and used by or for the Government for governmental purposes, without payment to me of any royalty thereon.

The present invention provides improvements in heating systems which are adapted to provide heat in many environments and to many applications under severe conditions of climatic cold. Thus, for example, the improved system of the present invention may be employed as a space heater for heating the interior of vehicular passenger compartments, for facilitating the starting of motors under severe conditions of cold, for preventing freezing of water in out-of-door hydrants, such as fire plugs, or maintaining hose-lines or other fire-fighting equipment in operable condition independently of surrounding temperatures. The heating system of this invention is characterized by a high degree of structural simplicity and economy of operation, while at the same time performing the functions for which it is intended.

In view of the strategic importance of arctic locales in the overall picture of national defense, the problem of maintaining equipment in condition for immediate availability is of increasing importance and this is particularly so where the equipment is of strategic character and potentially needed for instant operation. Therefore, the problems of providing heat for accelerating the starting of airplane engines or the motors of motor-driven military equipment, of providing adequate warmth for comfort in vehicular passenger compartments, for maintaining fire-fighting equipment in condition for instant service independently of climatic temperatures, are receiving increasing attention and are assuming increasing importance; and, obviously, many different suggestions and ideas have been embodied in operative equipment designed to accomplish these and other intended purposes of like import.

One of the needs for such equipment to fulfill is that it be quickly operative, and quickly produce the requisite amount of heat for fulfilling its function. For such purpose, there must be available substantially instantaneously a source of heat of requisite intensity for the substantially immediate production of operative temperatures for the intended purpose. The present invention has for one of its objects the production of equipment of such a character, wherein a comparatively large volume of fuel is substantially instantaneously ignited by an electric spark for producing a high combustion temperature substantially instantaneously for raising the temperature of a particular environment to desired operative values quickly and economically.

A further object of the invention is to provide a heating system of the above-indicated character which is operated primarily by the electrical system of a motor-driven vehicle or similar equipage, and which will be illustrated and described herein in connection with such embodiment, although it will be understood that the apparatus is not intended to be restricted necessarily to such an embodiment or to such a utility.

A still further object of the invention is to provide a closed heating system wherein all components are actuated by the velocity of exhaust combustion gases flowing from the combustion environment in which the fuel is being burned, the only requisite to continued operation being a continuous supply of combustible fuel to the combustion chamber.

The advantages of the improved heating system of the present invention will become apparent as the description proceeds, and the features of novelty will be pointed out in particularity in the appended claims.

The improved heating system of the invention will be apparent from the accompanying drawings as to the illustrative principles thereof, the drawings representing an illustrative embodiment of the system, but which is intended to be exemplary only in character.

In Fig. 1 of the accompanying drawings, there is diagrammatically shown, partly in section, partly in elevation, one embodiment of the instant invention illustrating the construction and arrangement of the operating parts of the system, and its electrical control circuits before starting the device.

In Fig. 2 of the accompanying drawings, there is shown a diagram of the electrical circuits disclosed in Fig. 1 and illustrating the position of the contacts on starting the device.

In Fig. 3 of the accompanying drawings, there is shown a diagram of the electrical circuits disclosed in Fig. 1 and illustrating the position of the contacts after starting the device.

Referring more particularly to the drawings, reference numeral 1 designates a shaft which has mounted thereon in suitably spaced relation a rotor 3 of a gas turbine, the housing of which is designated at 5, a second rotor 7 of an air-impeller device 9, a rotor, not shown, of a motor-generator 11, and a rotor of a rotary fuel pump 13, the shaft 1 being, therefore, a common drive means for these instrumentalities. The gas turbine, the air-impeller, the motor-generator and the rotary fuel pump are of standard construction and the details thereof need not be described for this reason.

Upon rotation of the shaft 1 and rotor 7 air is drawn in through an intake 15, and delivered through duct 17 into a combustion chamber 19 into which fuel is being introduced by pump 13 through fuel line 21 and fuel intake nozzle 23, as will be described in greater detail hereinafter. The fuel pump 13 receives suitable fuel through a fuel intake line 25, which communicates with a supply of fuel, not shown, which may be either a gaseous or a liquid fuel. Flow of fuel through the fuel line 21 may be controlled by the interposition of a suitable valve 27, which may be conveniently a solenoid-type control valve of any suitable standard construction and consequently needs no detailed structural description.

The combustion chamber 19 is enclosed by a water-jacket 29, having a water intake 31 and outlet 33, through which water is kept circulating, this water being heated by the combustion of the fuel in combustion chamber 19, the ignition of which is produced by providing a spark plug 35 connected by leads 37 and 39 to an ignition coil, shown diagrammatically at 41, and electrically connected with a conventional vibrator assembly 43 through leads 73 and 105. A tandem switch thermostat 49 is mounted in water outlet 33 of the water-jacket 29, and a second thermostat 51 is mounted in the combustion chamber 19 adjacent to the outlet 53 thereof, this outlet 53 communicating through duct 55 to the inside of the housing 5 of the gas turbine for supplying combustion gases from the combustion chamber 19 to the rotor 3 of the gas turbine.

The operative control members of the system are connected in a control circuit as shown in Fig. 1 and as better illustrated in Figs. 2 and 3. These various members are connected with each other and a source of electric power, such as the battery 101 in the circuits of Figs. 2 and 3 as follows:

One side of the double pole switch 91 is connected by contact $b$ to the positive side of the source of power 101. The other contact $b'$ of this side of the double pole switch is connected to the contact $d$ of the tandem thermostatically controlled switch 49 by the conductor 99. The other contact $d'$ of this side of the switch 49 is connected by the conductor 95 to the branch conductors 79 and 83. The branch conductor 83 being connected to one of the contacts $a$ on the other side of the double pole switch 91 and the branch conductor 79 being connected to one side of the solenoid of the magnetic valve 81 through conductor 75 and to one side of the thermostatic switch 51. The other side of the thermostatic switch 51 being connected to the conductor 71 which, in turn, is connected to one side of the vibrator 43. The other side of the vibrator 43 is connected through the conductor 73 to one side of the ignition coil 41, and the other side of the ignition coil 41 is connected through conductor 105 to the ground of the vibrator 43 and the conductor 77. The conductor 77 provides a suitable return connection to the negative side of the battery 101. The other side of the solenoid of the magnetic valve 81 is connected to the return 77 by the conductor 85. One side of the motor-generator 11 is likewise connected to the return 77 through the conductor 93.

The other side of the motor-generator is shown connected to a conductor 89 which is, in turn, connected to one contact $c$ on the other side of the tandem thermostatically controlled switch 49. The other contact $c'$ of this side of the switch 49 is connected to the conductor 87 which, in turn, is connected to the other contact $a$ of the double pole switch 91 to complete the circuit through that switch. The spark gap circuit shows the spark plug 35 connected to one side of the ignition coil 41 through conductor 37 and the other side of the coil connected to ground through the conductor 39.

The equivalent electrical control circuit is such that the ignition circuit is connected in parallel through the thermostatic switch 51 across the magnetic valve solenoid 81 and this parallel branch is in turn in parallel with a series circuit branch including the motor-generator 11, the switch contacts $c$—$c'$ of the thermostatic switch 49, and the switch contacts $a$—$a$ of the line switch 91. This parallel combination is then connected across the source of power 101 through the series arrangement of switch contacts $d$—$d'$ of the thermostatic switch 49 and switch contacts $b$—$b'$ of the line switch 91.

The thermostatic switch 51 is connected in series with the vibrator 43 through lead 71 which in turn is connected in series with ignition coil 41 through lead 73. The series branch of the thermostatic switch 51, vibrator 43, and ignition coil 41 is connected in parallel with a solenoid 81 through lead 75 and return leads 105 and 77. The above-described parallel circuit is further connected in parallel, through leads 79, 83 and return leads 85 and 93, across a series circuit comprising contacts $a$—$a$ of double pole switch 91, contacts $c$—$c'$ of a tandem thermostatically controlled switch 49, and motor-generator 11. Contacts $a$—$a$ of the double pole switch 91 are connected through the switch blade and lead 87 to contacts $c$—$c'$ of tandem thermostatically controlled switch 49 and positive side of battery 101. Contacts $c$—$c'$ of tandem thermostatically controlled switch 49 are connected through the bridge member 50 and lead 89 to motor-generator 11. The above-described parallel combination is in turn connected through lead 95 and return lead 99 across a series circuit comprising contact $d$—$d'$ of tandem thermostatically controlled switch 49 and the switch blade contacts $b$—$b'$ of double pole switch 91 and source of power 101. Contacts $d$—$d'$ of the tandem thermostatically controlled switch 49 are connected through bridge members 49$d$ and lead 99 to contacts $b$—$b'$ of double pole switch 91. Contacts $b$—$b'$ of the double pole switch 91 are connected through the switch blade and lead 103 to the source of power 101.

The operation of the system is as follows:

Switch 91 is closed by an operator and the contacts of both thermostatically controlled switches 49 and 51 are closed. Closing switch 91 completes the power circuit through the motor-generator 11 and causes it to operate as a motor to drive fuel pump 13. Switch 91 when closed also completes an electrical circuit through solenoid 81, and the control circuit of an ignition system which includes thermostat 51 and spark plug 35. Rotation of shaft 1 by motor 11 actuates rotor 7 of the impeller, and fuel pump 13 so that air and fuel are injected into the combustion chamber 19, the resulting mixture being ignited by the spark discharge from the spark plug 35. The resulting hot combustion products pass from the combustion chamber through outlet 53 and when the combustible products reach a predetermined temperature, the contacts of thermostatic switch 51 open and the circuit through this switch and the spark plug 35 is broken to inactivate the spark plug. However, fuel continues to be injected and burned as long as the predetermined heat demands actuating the thermostatically controlled switch 49 are not fulfilled, the water in the jacket 29, and the combustion chamber 19 continue to be heated. Due to this heating process the hot combustion gases flow in ever increasing volume through the outlet 53 from the combustion chamber 19 and duct 55, and thence to the rotor 3 of the gas turbine 5. The volume of the hot combustion gases operating the rotor 3 is substantially greater than the volume of air being drawn through the intake port 15 to the blower rotor 7, this volume differential thus driving the rotor 3 at speeds considerably above the speed of rotation thereof imparted by the shaft when the shaft is being driven by motor 11. The increased speed of rotation of the shaft 1 under action of the combustion products converts the actuation of motor-generator 11 from a motor to a generator having a current output sufficiently high to charge the battery 101 and also to maintain the solenoid coil 81 of the fuel control valve energized to maintain this valve open for continuation of the fuel supply, it being understood that the battery 101, the motor-generator 11 and the solenoid coil 81 are connected in parallel, the coil 81 remaining energized as long as the thermostatically controlled switch 49 remains closed so that fuel and air are continued to be supplied to the combustion chamber and the water in the jacket 29 continues to be heated, until the temperature of this water reaches the predetermined setting of the thermostatically controlled switch 49, causing the contacts $c$—$c'$ and $d$—$d'$ to open, thus breaking the circuit through coil 81 to close the valve 27 and stopping the operation of the system.

However, the stoppage of the operation of the system is not instantaneous, since all fuel must be burned in the combustion chamber before the gas turbine rotor 3 stops running. In view of this fact, and in order to prevent accumulation of fuel pressure in the fuel line 21 after the supply is shut off at nozzle 23 responsively to closing of control valve 27, there is provided desirably a fuel by-pass 107 around the fuel pump 13, this by-pass being connected into the fuel line at 109 below the pump 13 and at 111 above the pump, any excess fuel draining into the pump until the latter is stopped for eliminating any tendency to excess pressure against the valve 27.

It will be apparent from the foregoing that while the diagrammatic showing of the system represents a preferred embodiment of the improvements comprising the substance of this invention, it will be understood that various structural details thereof are subject to modification without departing from the inventive concept, and that, accordingly, it is intended and desired to embrace within the scope of the invention such modifications and changes as may be necessary or desired to adapt the invention to varying conditions and uses, as defined by the appended claims.

Having thus described my invention, what I claim as new and wish to secure by Letters Patent is:

1. In an apparatus of the character described the combination with a heating plant comprising a combustion chamber provided with intake and exhaust ends, a water-jacket surrounding the combustion chamber intermediate its ends, the water-jacket being formed with inlet and outlet nipples adapted to be connected with a source of water supply, a fuel system adapted to supply fuel to the combustion chamber under controlled conditions and including a fuel pump, a conduit connected at one end with the pump and terminating at its free end in a fuel injection nozzle extending through the intake end of the combustion chamber and into the latter, said conduit including a valve normally closed but operable to permit the flow of fuel through said conduit, an ignition system including an igniting device extending into the combustion chamber and terminating with its firing end adjacent the free end of the fuel injecting nozzle, a blower in communication with the intake end of the combustion chamber and a turbine in communication with the exhaust end of said chamber, said turbine being operated by the products of combustion escaping from said chamber, an operating shaft common to the fuel pump, the blower, and the turbine, a motor-generator set in operative relation with said common shaft and adapted to operate successively as a motor to drive said shaft and as a generator to provide an auxiliary source of electrical power; of control means for effecting operation of said heating plant and embodying an electro-magnetic device connected with said fuel valve to operate the latter to open and closed positions, an operating circuit in electrical relation with the electro-magnetic device, the ignition system and motor-generator set, a primary source of electrical energy for said operating circuit, a primary thermo responsive device extending into the exhaust end of the combustion chamber, a normally closed switch connected with said thermo responsive device, said switch controlling the electrical relation between the operating circuit and the ignition system and being operable to open position to cut out said ignition system when the temperature of the combustion chamber attains a pre-determined degree; a second thermo responsive device extending through and into the interior of the outlet nipple of the water-jacket, dual switch members connected with said last named thermo responsive device, said switch members being normally closed but simultaneously operable to open position when the temperature in the water-jacket attains a pre-determined degree, one of said switch members controlling the electrical relation between the operating circuit and the electro-magnetic device, the other of said members controlling said relation between the motor-generator set and the operating circuit.

2. A heating apparatus comprising, in combination, a combustion chamber, a jacket enclosing said combustion chamber and having mutually spaced inlet and outlet connections for circulating fluid through said jacket, a source of fuel, ignition means operatively associated with said combustion chamber, electromagnetically controlled means connected to said fuel source for regulating the amount of fuel introduced into said combustion chamber, fuel pumping means connected intermediate said fuel source and said electromagnetically actuated fuel regulating means, air supply means connected to said combustion chamber and cooperating with said fuel supply means to provide a combustible mixture within said combustion chamber, a gas turbine communicating with said combustion chamber for operation by the products of combustion exhausted from said combustion chamber, electromagnetic drive means, a common drive shaft connecting said electromagnetic drive means, said fuel pumping means, said air supply means and said gas turbine, an energizing source for said electromagnetic drive means, a first thermostatically controlled switch having a temperature sensitive element within said combustion chamber, a second thermostatically controlled switch having a temperature sensitive element within the fluid in said outlet connection, said first thermostatically controlled switch responding to predetermined temperatures prevailing in said combustion chamber effective to control the operation of said ignition means, said second thermostatically controlled switch responding to predetermined temperatures of the fluid circulating in said jacket effective to control the operation of said fuel supply means whereby when the fluid circulating in said jacket increases to a predetermined temperature, said second thermostatically controlled switch operates to disconnect said electromagnetic fuel supply control and said electromagnetic drive means from said energizing source, thus controlling the operation of the heating apparatus responsive to predetermined temperatures of fluid circulating in said jacket.

3. Heating apparatus as recited in claim 2 wherein the volume of the hot products of combustion resulting from ignition of the fuel and air mixture introduced into the combustion chamber and exhausted therefrom through said gas turbine rotates said gas turbine at velocities in excess of the velocity imparted by said electromagnetic drive means through said common shaft, thereby operating said electromagnetic drive means as a generator to maintain said energizing source at a predetermined energy level.

4. Heating apparatus as recited in claim 2 wherein said first thermostatically controlled switch operates sequentially in advance of said second thermostatically controlled switch, said first switch controlling said ignition means and being responsive to attainment of predetermined temperatures in said combustion chamber, said second thermostatically controlled switch operating responsive to predetermined temperatures of the fluid in said jacket and controlling said electromagnetically actuated fuel regulating means.

References Cited in the file of this patent

UNITED STATES PATENTS

| Number | Name | Date |
|---|---|---|
| 1,991,186 | Williams | Feb. 12, 1935 |
| 1,993,748 | Noack | Mar. 12, 1935 |
| 2,106,414 | Price | Jan. 25, 1938 |
| 2,364,458 | McCollum | Dec. 5, 1944 |
| 2,395,416 | McCollum | Feb. 26, 1946 |
| 2,414,828 | McCollum | Jan. 28, 1947 |